United States Patent [19]

Rieger

[11] Patent Number: 4,851,664

[45] Date of Patent: Jul. 25, 1989

[54] NARROW BAND AND WIDE ANGLE HEMISPHERICAL INTERFERENCE OPTICAL FILTER

[75] Inventor: Harry Rieger, San Diego, Calif.

[73] Assignee: United States of America as represented by the Secretary of the Navy

[21] Appl. No.: 213,034

[22] Filed: Jun. 27, 1988

[51] Int. Cl.⁴ ............... G01J 3/50; H01J 5/16; H01J 40/14

[52] U.S. Cl. .................... 250/226; 250/216; 350/162.11

[58] Field of Search ............ 250/216, 226, 239; 350/311, 314, 66, 161, 1.1; 356/416, 419, 225

[56] References Cited

U.S. PATENT DOCUMENTS

| | | | |
|---|---|---|---|
| 3,278,752 | 10/1966 | Brixner | 250/216 |
| 3,588,245 | 6/1971 | Herriott | 355/71 |
| 3,681,608 | 8/1972 | Derderian et al. | 250/231 R |
| 3,717,399 | 2/1973 | Taylor et al. | 350/166 |
| 3,976,875 | 8/1976 | Engstrom et al. | 250/226 |
| 4,158,133 | 6/1979 | Spaeth et al. | 250/211 J |
| 4,225,782 | 9/1980 | Kuppenheimer, Jr. et al. | 250/216 |
| 4,554,448 | 11/1985 | Sillitto | 250/216 |
| 4,806,747 | 2/1989 | Dunavan et al. | 356/152 |

FOREIGN PATENT DOCUMENTS 0058489  4/1983  Japan ................ 250/216

Primary Examiner—David C. Nelms
Assistant Examiner—Eric F. Chatman
Attorney, Agent, or Firm—Thomas G. Keough; Harvey Fendelman

[57] ABSTRACT

An optical interference filter has narrow linewidth and wide acceptance angle and includes a hemisphere coated to provide a narrow bandpass filter at a desired wavelength at normal incidence while other wavelengths at normal incidence are absorbed or reflected. A photodetector placed at the center of the hemisphere detects the desired wavelength only. Other wavelengths that are shorter than the wavelength of the filter are transmitted through the filter to be absorbed by a black absorbing surface around the photodetector. Thus, only the frequency of interest at normal incidence provides a representative signal at the detector.

7 Claims, 1 Drawing Sheet

NARROW BAND AND WIDE ANGLE HEMISPHERICAL INTERFERENCE OPTICAL FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A wide variety of optical filters have been fabricated which selectively pass or block wavelengths of interest. Some conventional wide acceptance angle filters, usually referred to as color filters, are relatively broadband and have passbands of 50 nanometers and more. Another type of optical filter is generally referred to as an interference filter and functions to control the spectral composition of radiant energy partially by the effects of its interference. These filters are fabricated by depositing thin layers of dielectric materials, each with a different index of refraction, on a polished glass substrate and are well known and have been widely used in a good number of applications, see for example the article entitled "Interference Filters" *The Optical Industry and Systems Directory* (1984) pages E-65 through E-67. They can allow narrow passbands and high transmittance to the selected wavelength at normal incident. The filter is transmissive at shorter wavelengths at angles off the normal incident (the larger the angle the shorter the wavelength). Other classes of filters are characterized by birefringent filters, atomic resonance filters, and so forth. Generally, these filters tend to be overly complex and limited in applications, partially because they are expensive.

Thus, a continuing need exists in the state-of-the-art for an optic filter which is cost effective and has narrow band and wide acceptance angle.

SUMMARY OF THE INVENTION

The present invention is directed to providing a hemispherically shaped optical filter that produces a wide acceptance angle. A suitable deposition of multiple dielectric layers is applied onto an optically transparent hemispherical shell. The multilayer dielectric has the property to pass a desired wavelength λ at normal incidence and can function as a narrow bandpass filter having a width as low as 1Å. A photodetector located at the center of the hemisphere provides representative signals when the desired wavelength strikes any location on the coated shell at a normal incident angle. A black absorbing surface disposed about the photodetector will absorb other shorter wavelengths that pass through the coating, so as not to interfere with representative signals produced by the desired normal incident impinging radiation. Keeping the size of the detector small with respect to the radius of the hemisphere assures that the detected linewidth is narrow.

An object of the invention is to provide an optical interference filter having a wide acceptance angle that is responsive only to normal incident light.

Another object is to provide a filter design having a narrow linewidth that is adaptable to a desire, selected wavelength.

Still yet another object is to provide a wide acceptance angle narrow band filter that is uncomplicated in design and therefore, of high reliability while being cost effective.

These and other objects of the invention will become more readily apparent from the ensuing specification when taken in conjunction with the appended claims and accompanying drawings.

DESCRIPTION OF THE PREFERRED EMBODIMENT

Figure 1:
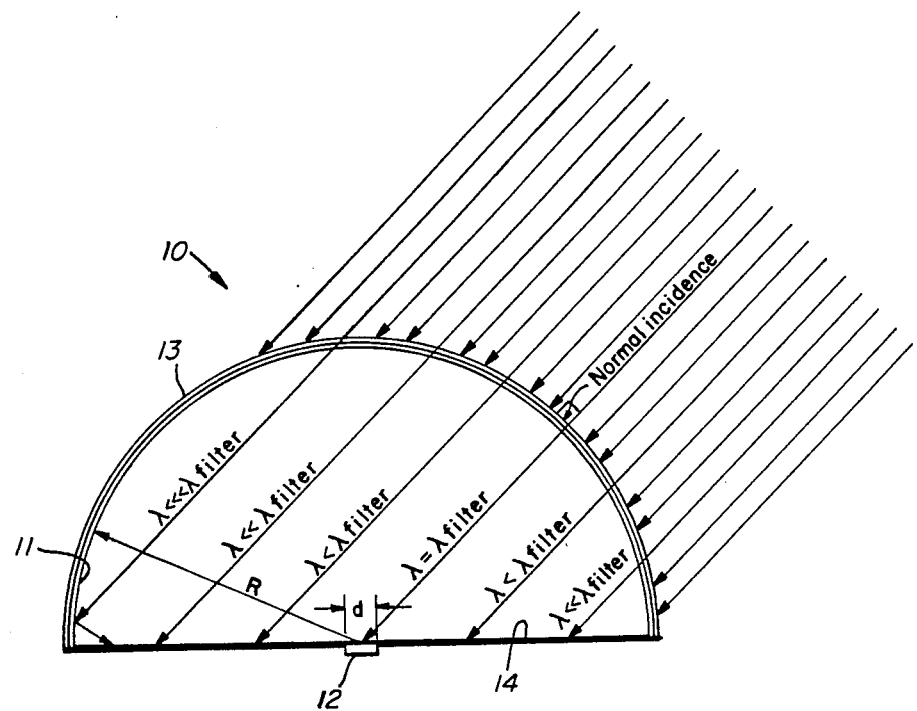
FIG. 1 shows a cross-sectional view of the wide acceptance anger filter having a narrow passband.

Referring now to the drawing, the wide acceptance angle filter 10 includes a hemispherically-shaped shell 11, selected from optical quality glass or quartz. The shell has a radius R which equidistantly locates a photodetector 12 from the inner surface of the shell. As explained below, the diameter, d, of the photodetector can be selected to provide for different passbands.

Hemispherically-shaped shell 11 is provided with a coating 13 of desired dielectric composition and thickness to systematically transmit only a particular frequency of incident optical wavelength by the well known optical interference phenomenon. Optical interference has been established as being the additive process whereby the amplitude of two or more overlapping waves are systematically attenuated and/or reinforced. An interference filter fabricated in the accordance with the teachings of this invention has an appropriate coating for controlling the spectral composition of received radiant wavelength by the effects of its interference. The coating used in this filter can be made up of thin layers of dielectric materials to allow narrow passbands with high transmittances. A wide variety of such coatings can be selected from commercially available substances to provide for the passing of a discrete wavelength λ incident at a normal attitude with respect to the surface of the coating on the hemispherically-shaped shell. A typical coating might be zinc sulfide (n=2.2) and cryolite (n=1.35). The layers thickness is of the desired wavelength (λ).

The coated hemispherically shaped shell provides a narrow passband filter at a desired wavelength λ and is referred to as a λ filter. The filter exhibits a high transmittance to normal incident λ radiation and a high absorption or reflection to any other wavelength at normal incident. The normal incident λ wavelength energy proceeds in-line to strike photodetector 12 and provide a representative output signal. Other wavelengths that are shorter than the wavelength of the λ filter are transmitted through the filter, but not at normal incident. These shorter wavelengths pass through the coating and shell and impinge on a black absorbing surface 14 of diameter 2R that lies in a plane reaching across the hemisphere. Thus, photodetector 12 being placed at the center of the hemispherically shaped λ filter detects λ incident radiation only and the rest of the transmitted light not at normal incident and having wavelengths shorter than λ energy is absorbed by black absorbing surface 14. The higher the ratio between the sphere radius R and the diameter d of photodetector 12 results a narrowing of the detected linewidths containing the λ radiation. A 1 Å width of the λ filter 13 has a zinc sulfide and cryolite coating with a radius R=25 cm and a photodetector diameter d=1 mm.

Thus, a designer is afforded great flexibility in determining not only the transmitted frequency of interest, but also the linewidth or passband of the filter by simply changing the dimensions of the sphere and detector along with the coating selected.

The well known interference filter technology which currently limits itself to normal incident light only, can be applied in this concept to provide a wide angle interference filter. Such a filter can be used with any light source and is not limited to collimated laser beams. The wavelength is selected in accordance with the coating and other materials used within the conventional interference filter technology limitations. The passband is selectable by merely redimensioning the configuration thusly described. As a consequence, a much simpler and more reliable filter is provided that is cost effective when compared to other filter designs which might have a similar capability.

Figure 2:
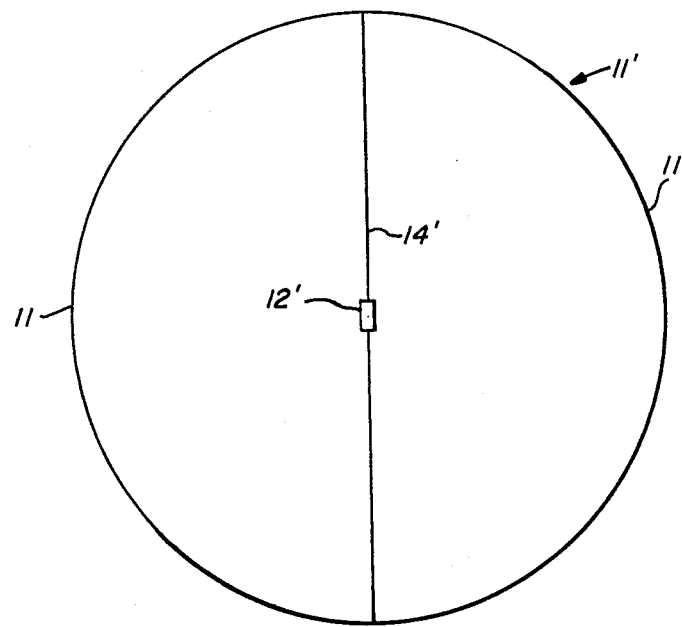
FIG. 2 shows a modification of this concept.

Optionally, noting FIG. 2, two hemispheric shells 11 are put together back-to-back as an integrated sphere that is composed a spherical glass or quartz. An optically absorbent surface 14' can be provided that is absorbent to incident light energy on both sides and a photodetector element 12' is selected that can sense radiation from both sides. Both hemispherical or spherical designs could be fabricated from many small interference filter flats. By suitable application of suitable coatings, the filter can be made band pass or band stop in accordance with the needs at hand.

Obviously, many modifications and variations of the present invention are possible in the light of the above teachings. It is therefore to be understood that within the scope of the appended claims the invention may be practiced otherwise than as specifically described.

I claim:

1. A wide acceptance angle filter for transmitting normal incident $\lambda$ optical radiation comprising:

a hemispherically shaped shell being optically transmissive therethrough;

a coating provided on the shell fabricated to transmit incident normal optical radiation of wavelength and smaller;

a photodetector disposed at the radial center of the hemispherically-shaped shell; and a radiation absorbing surface disposed in the same plane as the photodetector and sized to extend across the diameter of the hemispherically-shaped shell for absorbing nonincident radiation of shorter wavelength than $\lambda$.

2. An apparatus according to claim 1 in which the hemispherically-shaped shell has a radius R, the photodetector has an effective diameter d, and the radiation absorbing surface has a diameter equal to 2R.

3. An apparatus according to claim 2 in which the coating has a composition to transmit incident radiation of wavelength $\lambda$ and blocking and reflecting longer wavelengths and passing incident radiation of wavelengths less than $\lambda$ at other than normal incidence to the surface of the hemispherically shape shell.

4. An apparatus according to claim 3 in which two hemispherically-shaped shells are provided back to back and include at least one photodetector with an oppositely backed black absorption surface to provide for an omnidirectional $\lambda$ radiation detection capability.

5. An apparatus according to claim 3 in which the hemispherically-shaped shell is composed of many small interference filter flats.

6. An apparatus according to claim 3 in which the hemispherically-shaped shell is selected from a homogeneous optically transparent substance.

7. An apparatus according to claim 3 in which the coating is zinc sulfide and cryolite to pass $\lambda$ radiation of 1 Å, the radius R=25 cm
   and the diameter d=1 mm
   to provide a 1 Å passband.

* * * * *